(12) United States Patent
Deutschmeyer et al.

(10) Patent No.: US 9,833,733 B2
(45) Date of Patent: Dec. 5, 2017

(54) APPARATUS FOR CONDITIONING OF GASES

(71) Applicant: Hydac Process Technology GmbH, Neunkirchen (DE)

(72) Inventors: Manfred Deutschmeyer, Perl (DE); Bernhard Schlichter, Saarbrücken (DE); Sergej Zeller, Katzweiler (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 103 days.

(21) Appl. No.: 14/402,345

(22) PCT Filed: Apr. 5, 2013

(86) PCT No.: PCT/EP2013/001019
§ 371 (c)(1),
(2) Date: Nov. 20, 2014

(87) PCT Pub. No.: WO2014/000837
PCT Pub. Date: Jan. 3, 2014

(65) Prior Publication Data
US 2015/0143997 A1    May 28, 2015

(30) Foreign Application Priority Data

Jun. 26, 2012    (DE) .......................... 10 2012 012 727

(51) Int. Cl.
*B01D 45/18*    (2006.01)
*B01D 46/00*    (2006.01)
*B01D 46/10*    (2006.01)
*B01D 53/24*    (2006.01)
*B01D 45/16*    (2006.01)
*B01D 45/12*    (2006.01)

(52) U.S. Cl.
CPC ............. *B01D 45/18* (2013.01); *B01D 45/16* (2013.01); *B01D 46/0005* (2013.01); *B01D 46/0086* (2013.01); *B01D 46/10* (2013.01); *B01D 53/24* (2013.01); *B01D 45/12* (2013.01)

(58) Field of Classification Search
CPC ........ B01D 45/18; B01D 45/16; B01D 53/24; B01D 45/12; B01D 46/0086; B01D 46/0005; B01D 46/10
See application file for complete search history.

(56) References Cited

U.S. PATENT DOCUMENTS 3,130,157 A * 4/1964 Kelsall ..................... B04C 5/18
                                                    209/731
3,499,531 A * 3/1970 Feasel ...................... B04C 5/16
                                                    210/114

(Continued)

FOREIGN PATENT DOCUMENTS

DE    10 2009 025 395 A1    12/2010
EP       0 628 345 A2        12/1994

(Continued)

*Primary Examiner* — Dung H Bui
(74) *Attorney, Agent, or Firm* — Wenderoth, Lind & Ponack, L.L.P.

(57) ABSTRACT

An apparatus for conditioning of gases, particularly sealing gas, includes a separator unit (3), particularly for separating liquids and/or particles from the gas flowing through the apparatus, and a collecting container (1) for the trapped substances. The separator unit (3) has a cyclone separator (3).

19 Claims, 4 Drawing Sheets

(56) References Cited

U.S. PATENT DOCUMENTS

| | | | | |
|---|---|---|---|---|
| 3,788,044 | A * | 1/1974 | McNeil | B01D 3/06 55/435 |
| 3,820,310 | A * | 6/1974 | Fromknecht et al. | A47L 7/0038 55/337 |
| 3,821,830 | A * | 7/1974 | Sundheim | A47L 11/34 15/321 |
| 3,980,439 | A * | 9/1976 | Mayer | B01J 8/44 201/31 |
| 4,201,256 | A * | 5/1980 | Truhan | B01D 45/12 144/252.2 |
| 5,271,245 | A | 12/1993 | Westermeyer | |
| 5,403,569 | A * | 4/1995 | Abdelmalek | B01D 53/002 423/220 |
| 5,961,701 | A | 10/1999 | Hlynsky | |
| 6,027,541 | A * | 2/2000 | Siemers | B01D 45/16 55/429 |
| 7,282,074 | B1 * | 10/2007 | Witter | B01D 45/12 451/453 |
| 2001/0054213 | A1 * | 12/2001 | Oh | A47L 9/1633 15/353 |
| 2002/0134059 | A1 * | 9/2002 | Oh | A47L 9/1683 55/337 |
| 2004/0040273 | A1 * | 3/2004 | Lewin | B01D 45/12 55/447 |
| 2004/0197622 | A1 * | 10/2004 | Wheat | B01D 45/12 429/413 |
| 2005/0039599 | A1 | 2/2005 | Johnson et al. | |
| 2005/0188852 | A1 * | 9/2005 | Flynn | B01D 45/16 96/372 |
| 2005/0223685 | A1 * | 10/2005 | Bertram | B01D 45/12 55/345 |
| 2006/0042206 | A1 * | 3/2006 | Arnold | A47L 9/1608 55/424 |
| 2006/0130448 | A1 * | 6/2006 | Han | A47L 9/1666 55/434.2 |
| 2006/0207231 | A1 * | 9/2006 | Arnold | A47L 9/1633 55/337 |
| 2007/0199284 | A1 * | 8/2007 | Yoo | A47L 9/1633 55/345 |
| 2007/0209519 | A1 * | 9/2007 | Conrad | A47L 5/28 96/414 |
| 2008/0190288 | A1 * | 8/2008 | Chu | B01D 47/06 95/24 |
| 2011/0041695 | A1 * | 2/2011 | Guerry | B01D 45/16 96/397 |
| 2011/0233144 | A1 * | 9/2011 | McCabe | B01D 19/0036 210/748.16 |
| 2011/0271836 | A1 * | 11/2011 | Phillips | B01D 45/12 95/271 |
| 2012/0024151 | A1 * | 2/2012 | Gray | B01D 45/12 95/24 |
| 2013/0118960 | A1 * | 5/2013 | Tandon | B04C 5/28 210/95 |
| 2014/0059983 | A1 * | 3/2014 | Ho | B01D 45/16 55/343 |

FOREIGN PATENT DOCUMENTS

| | | |
|---|---|---|
| EP | 1 275 432 A1 | 1/2003 |
| WO | WO 2004/067148 A2 | 8/2004 |

* cited by examiner

APPARATUS FOR CONDITIONING OF GASES

FIELD OF THE INVENTION

The invention relates to an apparatus for the conditioning of gases, in particular of sealing gas, comprising a separator unit for separating liquids and/or particles from the gas flowing through the apparatus, and comprising a collecting container for the trapped substances.

BACKGROUND OF THE INVENTION

Apparatuses of this kind are prior art. One area of application of such apparatuses is the conditioning of sealing gas. When handling corrosive process gases, for example, during pumping using turbo compressors, the known risk of sensitive parts of the pump, bearing points and/or sealing systems being attacked due to solid particles along with moisture present in the associated process gas exists. To counter this risk, sensitive parts, for example, the bearing points, must be protected by sealing gas in the form of a continuous flow of inert gas, with the inert gas flowing over the parts of the system to be protected. An appropriate inert gas may be dry nitrogen. During operation, the pressure of the sealing gas should be higher (for example, approximately 3 bar) than the process gas pressure, so that no process gas is able to pass into the atmosphere. In view of the usually high pressure of the process gas, frequently greater than 100 bar, the gas conditioning apparatus must be designed up to a high pressure level.

SUMMARY OF THE INVENTION

An object of the invention is to provide an improved apparatus for conditioning gases, which apparatus is low-maintenance and, therefore, cost-effective to operate, and is distinguished by an efficient separation effect.

The object is basically achieved according to the invention by an apparatus, having, as an essential particular feature of the invention, a separator unit including a cyclone separator. By using a cyclone separator, a largely maintenance-free operation of the apparatus with highly efficient separation is feasible, making the apparatus cost-effective and efficient to operate.

Accordingly, the invention is distinguished by the fact that the separator unit is mounted on the collecting container as a discrete, replaceable unit through which gas is able to flow. Adaptation to individual process conditions, such as type of gas, type of stresses caused by moisture and solid particles, by flow-through rates and the like, requires that only the separator unit be changed. The collecting container together with the auxiliary equipment normally associated with it may remain in place. In view of the high pressure level of, for example, greater than 100 bar, and the corresponding complex, pressure-resistant construction, the potential for using the same collecting container with associated equipment, such as fittings and the like, under changing operating conditions is of great economic significance.

The separator unit may be advantageously mounted on the top of the collecting container and may be connected to the collecting container via an inlet opening of the collecting container.

With respect to the cyclone separator, advantageously it includes a cyclone housing, on which an inflow opening is disposed such that the gas flow within the housing forms a swirl flow about the vertical axis thereof. An outflow unit has an outflow channel extending upward coaxially relative to the vertical axis on the cyclone housing.

For an outflow connection situated on the side of the cyclone housing, alternatively the outflow unit can be configured in such a way that the outflow channel includes a section, which is connected to its initial vertical section and which extends horizontally to the inflow connection located on the side.

Thus, apparatuses adapted to different process conditions, in each case with an identical collecting container, may be implemented in the form of a modular system, by appropriately replacing the cyclone housing on the collecting container and/or, if needed, by equipping the cyclone housing with an outflow unit, which is designed for an outflow connection situated on the top, or for an outflow connection located on the side.

In particularly advantageous exemplary embodiments, the apparatus includes a gas cooler in the flow path of the gas flowing toward the separator unit. This cooler opens up the possibility during operation of the apparatus of cooling the particular gas to a temperature below the dew point, for example, to a temperature of 10° K. below the dew point, to form condensate from the vaporous phase for separation with the aid of the cyclone.

Preferably, a controllable outlet device for trapped fluid is provided at the bottom of the collecting container. In this case, the outlet device can be arranged to be manually controllable, for example, by a needle valve or ball cock provided at the particular outlet connection.

In advantageous exemplary embodiments, a sensor device detects the fill level of trapped fluid and may be attached to the collecting container. Such exemplary embodiments offer the possibility of providing an outlet device controllable in response to a signal of the sensor device. The system may then be designed for automatic operation over longer operating periods.

Instead of a manually controllable outlet device or an outlet device or an outlet device controllable by a signal of the sensor device, an outlet device may also be provided for an automatic operation, which operation is controllable by a float situated in the collecting container.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
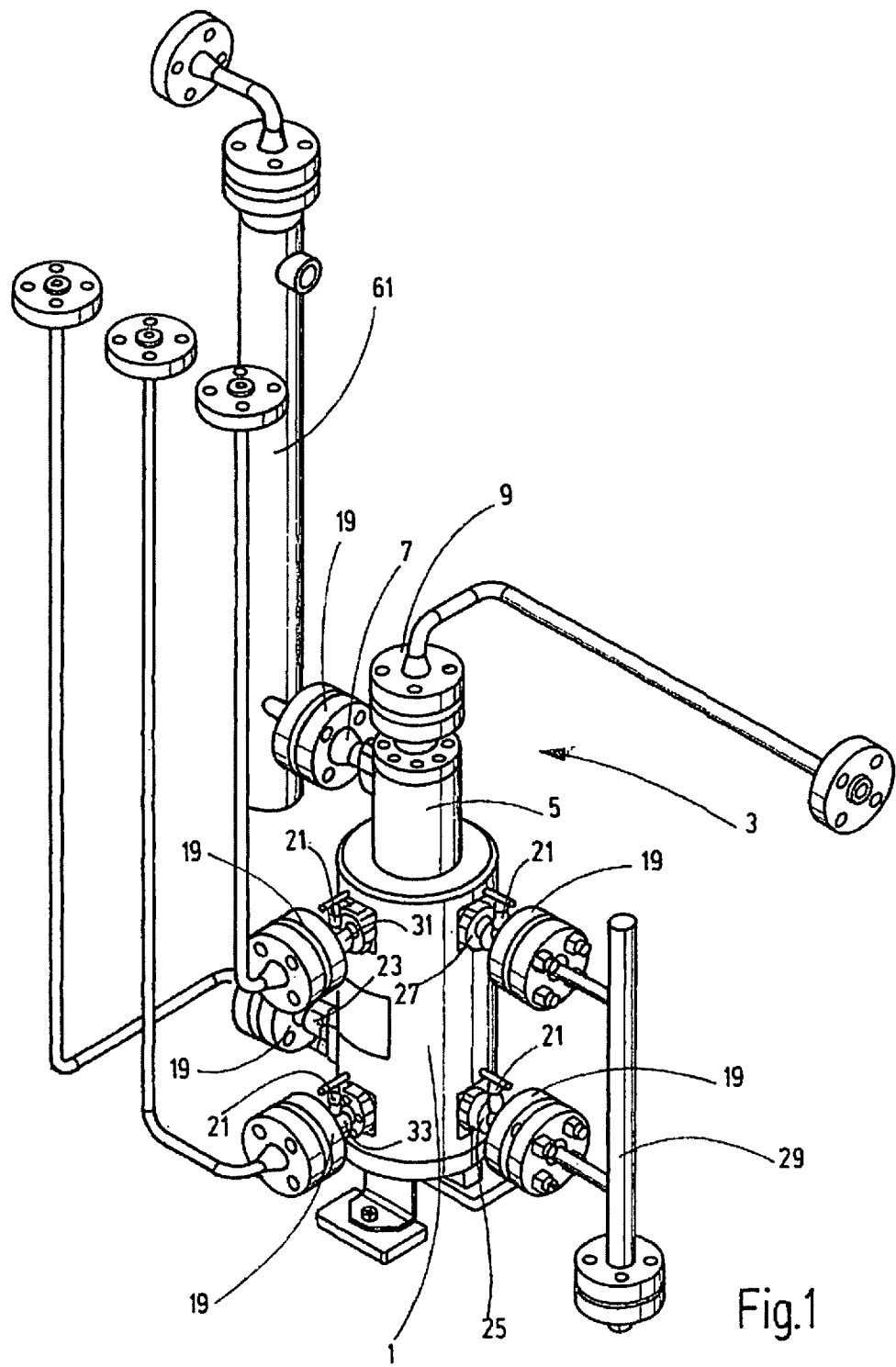
FIG. 1 is a perspective view of an apparatus according to a first exemplary embodiment of the invention.
Figure 2:
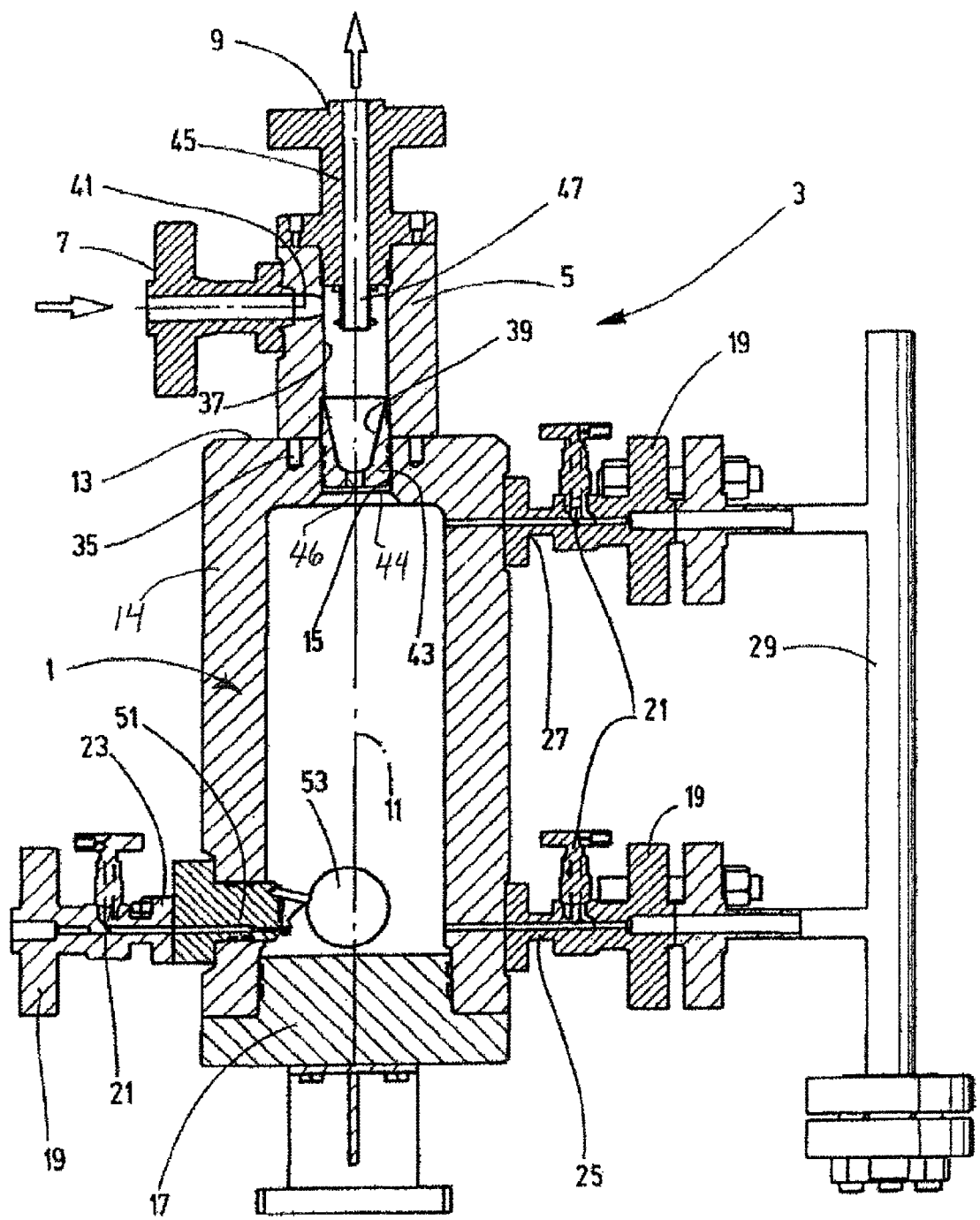
FIG. 2 is a side view in section of the collecting container with associated subcomponents of the apparatus of FIG. 1, reduced by approximately a factor of eight in the drawing in relation to a practical embodiment.

In FIG. 1, a collecting container 1 has a removable cyclone separator 3 mounted on the top thereof. Situated on the cyclone housing 5, shown in greater detail in FIG. 2, is an inflow connection or gas inlet 7 for the entry of the gas to be conditioned, and an outflow connection or gas outlet 9. The collecting container 1 is in the shape of a hollow cylinder having a vertical longitudinal axis 11. The cylinder is closed at its top by top or upper wall 13 located above in the drawing up to an inlet opening or central bore 15. The upper wall 13 extends inwardly and radially from the side wall 14 of the collecting container 1 relative to the longitudinal axis 14. The central bore 15 is radially spaced from the side wall 14 of the collecting container 1. The lower end is tightly sealed by a bottom piece 17. Collecting container 1 together with the bottom piece 17 exhibit a correspondingly high wall strength 1, for forming a pressure container for a high pressure level of greater than 100 bar.

As is most clearly seen in FIG. 1, multiple connections, each provided with a connecting flange 19 and a needle valve 21, are situated on the collecting container 1. An outlet connection 23 and a sensor connection 25 are visible in FIG. 2 in the area of the bottom piece 17. A second sensor connection 27 is situated vertically above the bottom sensor connection 25. Both sensor connections 25, 27 are connected to a sensor device 29, which, together with the interior space of the collecting container 1, form a type of communicating pipe. To detect the fill level in the collecting container 1, the sensor device 21 includes a device of a known type for contactlessly indicating the position of an element situated in the sensor tube, for example, a float having permanent magnetic or ferromagnetic components.

Figure 3:
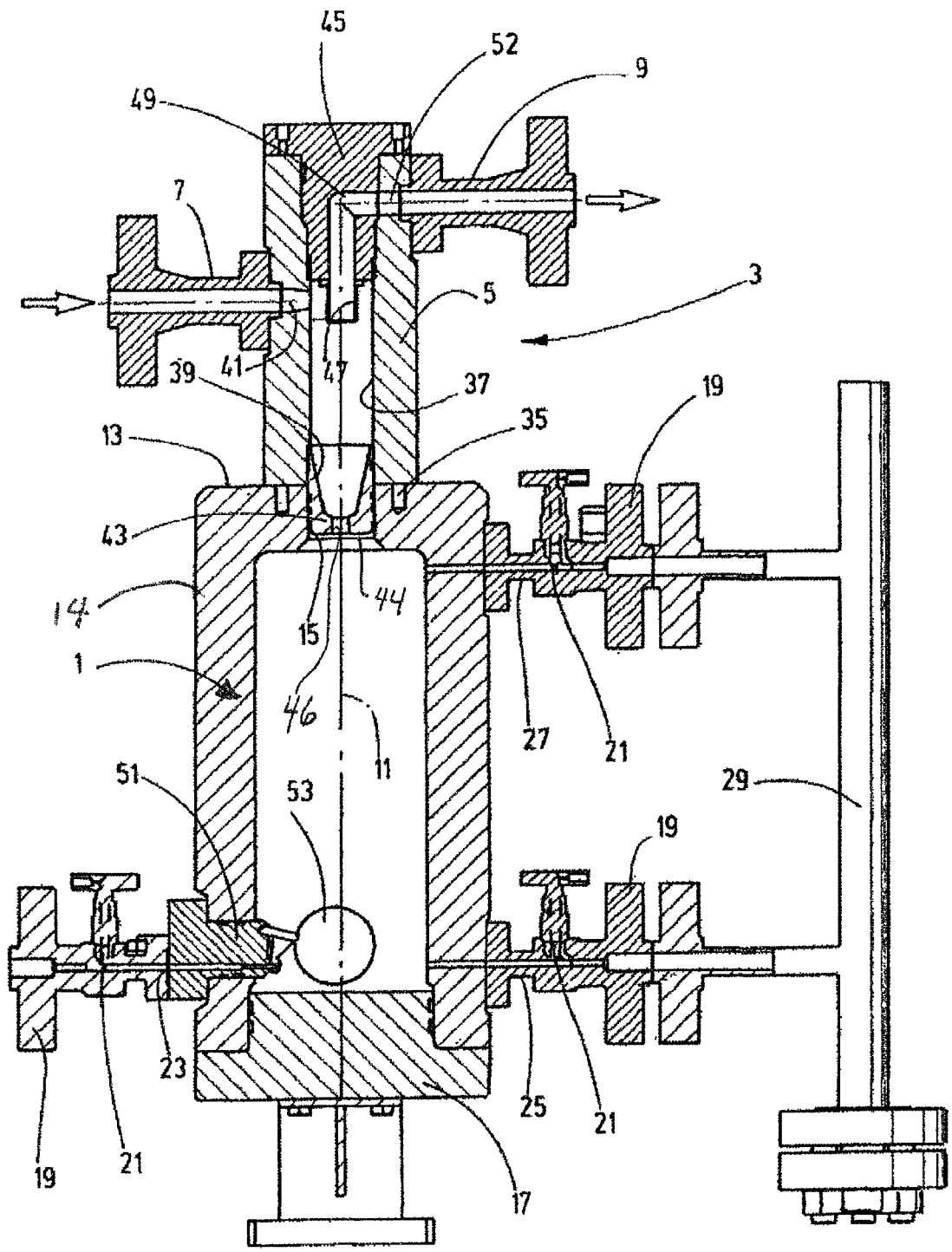
FIG. 3 is a side view in section of a collecting container with associated subcomponents of the apparatus according to a second exemplary embodiment of the invention.

Apart from the connections visible in FIGS. 2 and 3, a ventilation connection 31 is at the level of the upper sensor connection 27, and a second outlet connection 33 is situated at the bottom on the collecting container 1, as shown in FIG. 1. Of the two outlet connections 23 and 33, the outlet connection 23 is provided for an automatically controlled outlet of substances trapped in the collecting container 1, whereas the second outlet connection 33 is provided for a manually controlled release by activating the associated needle valve 21.

As shown in FIGS. 2 and 3, the cyclone separator 3 with its cyclone or separator housing 5 in the two exemplary embodiments shown in these figures, is removably mounted on the top wall 13 of the collecting container 1 by screws 35. Depending on the conditions, separators of desired cyclone size and/or design may be mounted on the collecting container 1. As is conventional in the case of cyclone separators 3, the cyclone housing 5 includes an acceleration cone or conical surface 39 at the lower end of the inlet cylinder 37, which cone extends at the transition between housing 5 and the top 13 of the collecting container 1 and into the inlet opening 15 of housing 5 and into the interior space of housing 5. Due to the tapering of the cone 39, the rotational speed of the swirl flow generated by the flow of gas via the inflow opening 41 of the inlet connection 7 in the inlet cylinder 37 is accelerated in such a way that non-gaseous substances, such as fluids and/or particles, are flung against the wall of the cone 39, and decelerated to the point that they detach from the flow and migrate downward into the collecting container 1.

As shown in FIGS. 2 and 3, the acceleration cone 39 is formed in a cyclone plug 43. The acceleration cone 39 is formed by a conical surface terminating at a distance from the lower end 44 of the cyclone plug 43. A central passage 46 extends from a lower end of the conical surface and opens into the collecting space. Thus, if needed, not only can the cyclone separator 3 with the cyclone housing 5 be replaced, but, if needed, the plug 43 can also be switched, if another size and/or shape of the cone 39 is appropriate. Attached to the top of the cyclone housing 5, also replaceable, is an outflow unit 45. This unit has an outflow channel 47 as an immersion pipe extending coaxially relative to the vertical axis 11 in the inlet cylinder 37, which channel in the exemplary embodiment of FIG. 2 extends in a straight line along axis 11 to the outflow connection 9 located above.

The exemplary embodiment of FIG. 3 differs from the example in FIG. 2 solely in the different design of the outflow unit 45. In contrast to FIG. 2, the outflow channel 47 has a bend 49, at which the outflow channel 47 transitions into a horizontal section 52 leading to the now laterally positioned outflow connection 9.

Figure 4:
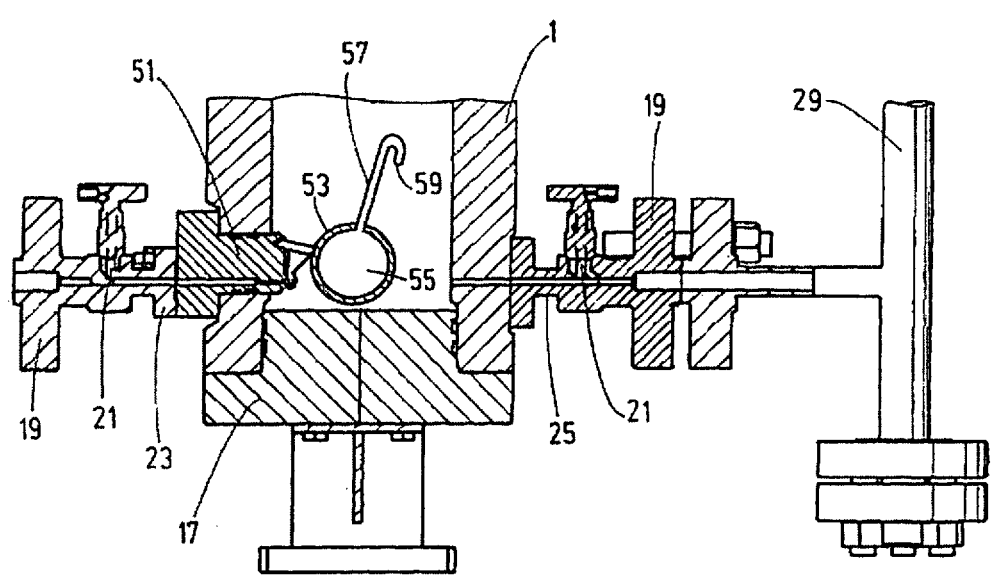
FIG. 4 is a truncated side view in section of just the bottom area of an apparatus according to a third exemplary embodiment of the invention.

In the two exemplary embodiments of FIGS. 2 and 3, the additional outlet connection 23 visible in FIGS. 2 through 4 is automatically controllable, in addition to the manually controllable outlet connection 33, which is visible only in FIG. 1. As an example of such a control, FIGS. 2 through 4 show a highly schematic simplified representation of a valve plug 51 situated the outlet connection 23, which valve plug contains a float valve. This float valve may be activated by a float ball 53, which floats to the surface of the fluid trapped in the collecting container 1. To generate a reliable buoyancy, the float ball 53 is preferably formed as a hollow ball, as shown in FIG. 4. To prevent the hollow float ball 53 from compressing under the at times substantially high pressure, which can build up in the collecting container 1, a pressure equalization device is provided for the interior space 55 of the ball 53, as shown in FIG. 4. The pressure equalization device in the example in FIG. 4 is formed by an equalizing tube 57, which is kinked at its upper end in such a way that substances trickling from above do not enter the pipe opening 59.

With the invention, a modular system may be implemented by using different cyclone sizes and cyclone designs in conjunction with a collecting container 1 that has the same design with associated components. Further adaptations may be made by variously designing the outflow unit 45 for the outflow connection 9 located above or the lateral outflow connection 9, and/or different plugs 43 may be used for desired shapes of the acceleration cone 39.

As shown in FIG. 1, a gas cooler 61 is connected to the connecting flange 19 of the inflow connection 7, in which the gas to be conditioned flowing into the cyclone separator 3 may be cooled. By cooling at a temperature below the dew point, for example, 10° K. below the dew point, vaporous phases can transition into liquid phases thereby to obtain an optimum separation in the cyclone separator 3.

While various embodiments have been chosen to illustrate the invention, it will be understood by those skilled in the art that various changes and modifications can be made therein without departing from the scope of the invention as defined in the claims.

The invention claimed is:

1. An apparatus for separating at least one of a liquid or a particle from a gas, the apparatus comprising:
   a separator housing having a gas inlet, a gas outlet and a hollow interior;
   a collecting container being connected to and below said separator housing and having a hollow connection space therein, said collecting container having a side wall extending along a longitudinal axis and having an upper wall extending inwardly and radially from said side wall relative to said longitudinal axis and being coupled to said separator housing; and
   a hollow cyclone plug extending into and between said hollow interior of said separator housing and said hollow collection space of said collecting container, an outer wall of said cyclone plug being sealed to inner walls of said separator housing and said upper and side walls of said collecting container, an inner wall of said cyclone plug having an interior opening on said hollow interior and said collecting space and having a downwardly tapered conical surface, said conical surface of said cyclone plug terminating at a distance from a lower end of said cyclone plug; and a central passage extending from a lower end of said conical surface and opening into said collecting space, said collecting space having a central bore in said upper wall receiving said cyclone plug, said central bore being radially spaced from said side wall of said collecting container.

2. An apparatus according to claim 1 wherein
said cyclone plug is removably mounted in said separator housing and said collecting container.

3. An apparatus according to claim 1 wherein
said outer wall of said cyclone plug is cylindrical.

4. An apparatus according to claim 1 wherein
said central passage has smaller cross-sectional dimensions than said lower end of said conical surface.

5. An apparatus according to claim 1 wherein
said hollow interior and said collection space are cylindrical.

6. An apparatus according to claim 1 wherein
said hollow interior and said collection space are circular cylinders.

7. An apparatus according to claim 1 wherein
said hollow interior has cross-sectional dimensions smaller than cross-sectional dimensions of said collection space.

8. An apparatus according to claim 1 wherein
said separator housing and said collecting container are discrete and separable units.

9. An apparatus according to claim 1 wherein
said gas inlet is disposed in said separator housing to create a swirl gas flow about a vertical axis of said separator housing; and
said gas outlet extends vertically upward and coaxially relative to said vertical axis.

10. An apparatus according to claim 1 wherein
a gas cooler is connected in fluid communication with said gas inlet.

11. An apparatus according to claim 1 wherein
said central passage is cylindrical.

12. An apparatus according to claim 1 wherein
said gas outlet comprises an outflow channel extending in a straight line.

13. An apparatus according to claim 12 wherein
said straight line extends along a vertical longitudinal axis of said separator housing.

14. An apparatus according to claim 13 wherein
a horizontal channel extends from said outflow channel.

15. An apparatus according to claim 1 wherein
a controllable valve is provided at a bottom section of said collection chamber for trapped fluid.

16. An apparatus according to claim 15 wherein
said controllable valve comprises a needle valve.

17. An apparatus according to claim 15 wherein
a float in said collecting container is connected to and said controllable valve.

18. An apparatus according to claim 1 wherein
a sensor is attached to said collection container and detects a fill level of trapped fluid in said collection container.

19. An apparatus according to claim 18 wherein
a controllable valve is provided at a bottom section of said collection chamber for trapped fluid;
said sensor is connected to said controllable valve, signals from said sensor controlling operation of said controllable valve.

* * * * *